United States Patent [19]

Unger

[11] Patent Number: 4,640,574
[45] Date of Patent: Feb. 3, 1987

[54] INTEGRATED, MICRO-OPTICAL DEVICE

[75] Inventor: Hans-Georg Unger, Braunschweig, Fed. Rep. of Germany

[73] Assignee: ANT Nachrichtentechnik GmbH, Backnang, Fed. Rep. of Germany

[21] Appl. No.: 525,887

[22] Filed: Aug. 24, 1983

[30] Foreign Application Priority Data

Aug. 25, 1982 [DE] Fed. Rep. of Germany ........ 3231492

[51] Int. Cl.[4] .............................................. G02B 6/12
[52] U.S. Cl. .............................. 350/96.11; 350/96.12
[58] Field of Search ............... 350/96.11, 96.12, 96.17, 350/162.2

[56] References Cited

U.S. PATENT DOCUMENTS

| | | | |
|---|---|---|---|
| 3,301,625 | 1/1967 | Ashkin et alf. | 350/96.12 X |
| 3,719,411 | 3/1973 | Midwinter | 350/96.12 X |
| 3,868,589 | 2/1975 | Wang | 350/96.12 X |
| 3,902,133 | 8/1975 | Watts | 350/96.11 X |
| 3,982,810 | 9/1976 | Tamir et al. | 350/96.12 X |
| 4,273,445 | 6/1981 | Thompson et al. | 350/96.17 X |
| 4,320,475 | 3/1982 | Leclerc et al. | 350/96.14 X |
| 4,360,921 | 11/1982 | Scifres | 350/96.11 X |

OTHER PUBLICATIONS

"Photodetector Elements and Relif-Type Diffraction Gratings in Thin Films of $As_2 S_3$ for Integrated Optics" Andriesh et al., Sov. J. Quantum Electron, 8(5) (May 1978).

"Integrated-Optic Wavelength Multi- and Demultiplexers Using a Chriped Grated and Ion-exchanged Waveguide" Suhara et al., Applied Optics, vol. 21, No. 12, (15 Jun. 1982).

Primary Examiner—William L. Sikes
Assistant Examiner—Akm E. Ullah
Attorney, Agent, or Firm—Spencer & Frank

[57] ABSTRACT

An integrated, micro-optical device for use in combination with a monomode fiber, a laser and a photodiode. A common substrate includes means for connecting the fiber, laser and photodiode to the device. A film waveguide is disposed on the substrate and presents a first beam path between the means for connecting the fiber and the means for connecting the photodiode. A refraction grating is disposed in the first beam path of the film waveguide. A second beam path is present by the film waveguide between the means for connecting the laser and the refraction grating. The refraction grating is constructed and positioned on the substrate so that the refraction grating transmits radiation coming from the fiber toward the photodiode and deflects radiation coming from the laser in the direction toward the fiber.

9 Claims, 3 Drawing Figures

INTEGRATED, MICRO-OPTICAL DEVICE

BACKGROUND OF THE INVENTION

The present invention relates to an integrated, micro-optical device for use in combination with a monomode fiber, a laser and a photodiode. The device includes a common substrate having means for connecting the fiber, laser and diode to the device.

SUMMARY OF THE INVENTION

It is an object of the present invention to provide an integrated, micro-optical device which can be easily monolithically integrated and wherein the fiber and laser radiation signals can be easily separated while simultaneously matching the laser output radiation to the fiber input.

The object and other objects are accomplished by the present invention wherein an integrated, micro-optical device is provided for use in combination with a monomode fiber, a laser and a photodiode. The device includes a common substrate having means for connecting the fiber, laser and photodiode to the device. A film waveguide is disposed on the substrate and presents a first beam path between the means for connecting the fiber and the means for connecting the photodiode. A refraction grating is disposed in the first beam path of the film waveguide. The same film waveguide presents also a second beam path between the means for connecting the laser and the refraction grating. The refraction grating is constructed and positioned on the substrate so that the refraction grating transmits radiation coming from the fiber toward the photodiode and deflects radiation coming from the laser in the direction toward the fiber.

DESCRIPTION OF THE PREFERRED EMBODIMENT

Figure 1:
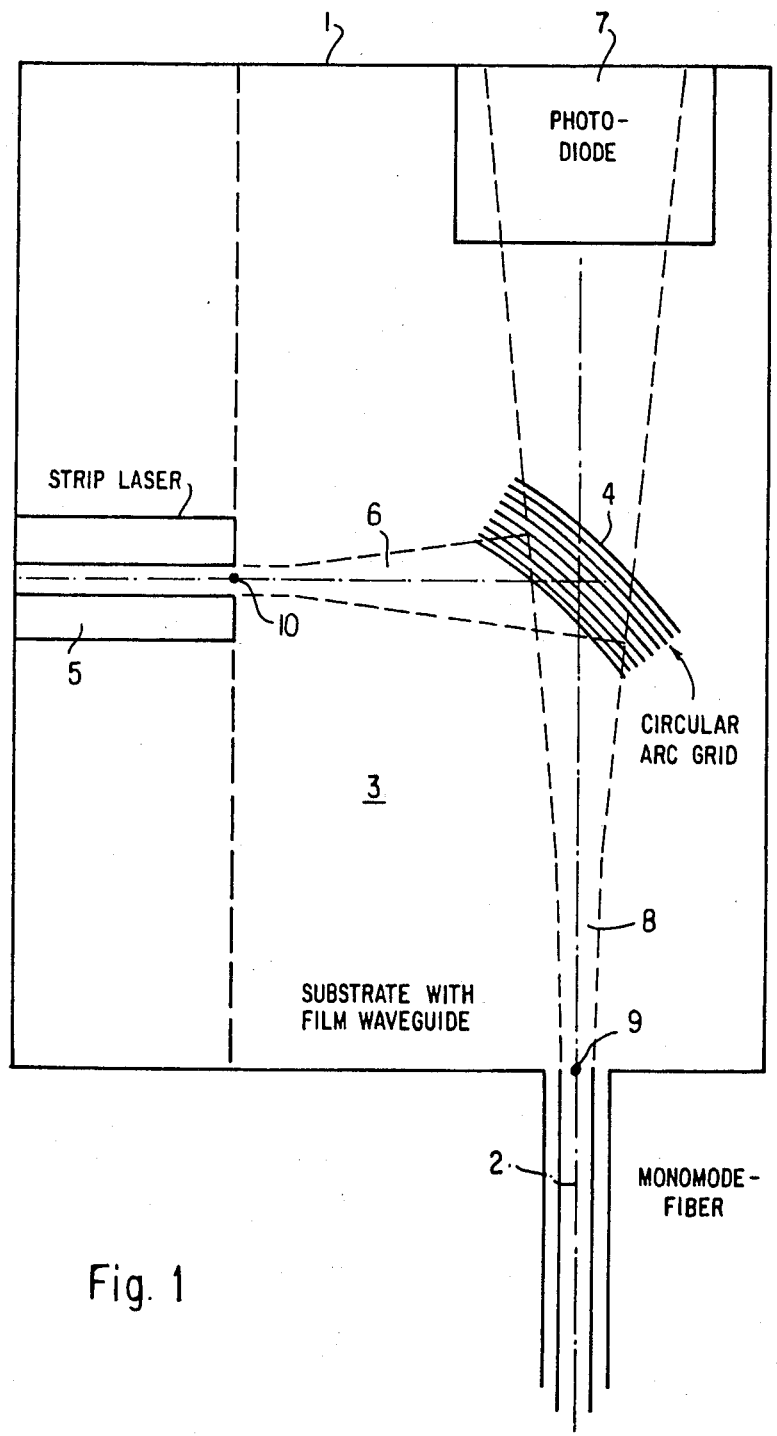
FIG. 1 is a schematic showing a plan view of an embodiment of the invention.

Referring to FIG. 1, the integrated, micro-optical device according to the invention includes a common substrate 1 onto which a monomode film waveguide 3 is applied. A monomode fiber 2 is coupled to substrate 1 at one end of film waveguide 3 and a photodiode 7 is integrated into substrate 1 at the other end of film waveguide 3. Fiber 2 excites, with its fundamental wave, a Gauss beam 8 in the fundamental mode of film waveguide 3. From the waist of the Gauss beam 8 at the location where fiber excitation occurs, the Gauss beam 8 gradually broadens and its beam characteristic asymptotically approaches a defined and constant angle which opens toward photodiode 7.

A refraction grating 4 is disposed in the beam path between fiber 2 and photodiode 7. In the illustrated embodiment, refraction grating 4 comprises confocal elliptical arc lines which are part of ellipses having their focal points 9 and 10 on the end face of fiber 2 and the end face of a laser 5 described below.

The waveguide 3 provides also a path 6 for the beam between refraction grating 4 and laser 5. The laser oscillation from laser 5, in its transversal fundamental order, likewise generates a Gauss beam 6 in the fundamental mode of film waveguide 3.

Laser 5 is preferably and advantageously a semiconductor strip laser disposed on substrate 1, thus forming a part of the integrated micro-optical device. Alternatively, laser 5 could be constructed as a separate module connected to substrate 1 in a manner well known in the art.

The spacing of the lines in refraction grating 4 is selected so that laser radiation in film waveguide 3 emanating from laser 5 is deflected by grating 4 into fiber 2 and radiation at a different wavelength relative to the laser radiation and emanating from fiber 2 is passed by grating 4 for transmission by film waveguide 3 toward integrated photodiode 7. There it is absorbed and generates a corresponding signal photocurrent.

More specifically, the spacing of the lines in refraction grating 4 is matched to the wavelength of the radiation wave in film waveguide 3 so that the individual grid lines produce constructive interference with respect to a deflection in the direction toward fiber 2. Thus, the laser radiation is completely deflected and is beamed into the fundamental mode of the connected fiber 2. Moreover, refraction grating 4 is given such a curvature that the phase fronts of the laser radiation arriving as a Gauss beam 6 in the fundamental film mode are transformed such that, after deflection, a Gauss beam 8 continues in the direction toward the fiber with its waist precisely at the fiber input and the width of this waist being adapted to the fundamental mode of fiber 2.

In order to achieve selective deflection of laser radiation, the deflected beam 8 need not necessarily be at right angle with the laser output beam 6 rather, other angles can also be realized.

Film waveguide 3 need not extend over the entire surface of substrate 1; it rather suffices to have the film waveguide 3 extend over all ranges which are reached by the Gauss beams 8 and 6. Since both strip laser 5 and photodiode 7 can be integrated in substrate 1 along with film waveguide 3 and refraction grating 4, the illustrated device can be produced in a simple manner as a uniform, monolithically integrated component.

Figure 2:
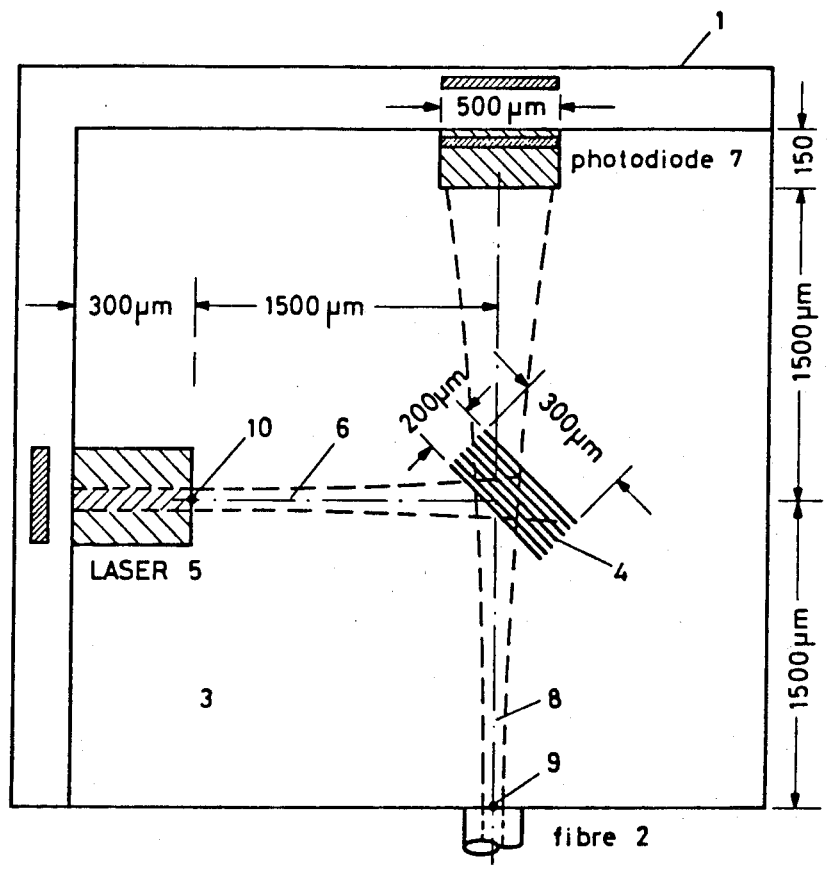
FIG. 2 is a schematic showing a specific embodiment of the invention including dimensions for operation at wavelengths near 1.3 $\mu$m.

FIG. 2 represents a specific embodiment of the device shown in FIG. 1. It has been designed to transmit laser radiation at a wavelength of 1.3 $\mu$m near the material dispersion minimum of fuzed silica fibres, and receive the fundamental mode out of a single-mode step index fibre 2 at a wavelength displaced at least by 50 nm from 1.3 $\mu$m. The fibre 2 has a core diameter of 10 $\mu$m and a numerical aperture of 0.1 corresponding to 0.25% relative index difference between its core and cladding. The substrate 1 consists of semi-insulating InP, on the surface of which a film waveguide 3 has been formed by first depositing a 2 $\mu$m thick buffer layer of $SiO_2$ and then a 0.4 $\mu$m thick guiding layer of $As_2S_3$. The large difference between the thickness of the guiding layer and the core diameter of the fibre 2 requires the film waveguide to be tapered near the fibre connection in order to match the fundamental fibre mode to the fundamental mode of the film waveguide in a manner well known in the art.

The lines of the refraction grating 4 run along confocal elliptical arcs and have been formed by irradiating the $As_2S_3$ film with a narrow electron beam that changes the amorphous state of the film locally and thereby raises its refractive index likewise locally. The grating 4 consists of nearly 500 confocal elliptical arc lines with neighbouring lines spaced by nearly 0.4 μm. It is altogether 200 μm deep and nearly 300 μm wide.

Figure 3:
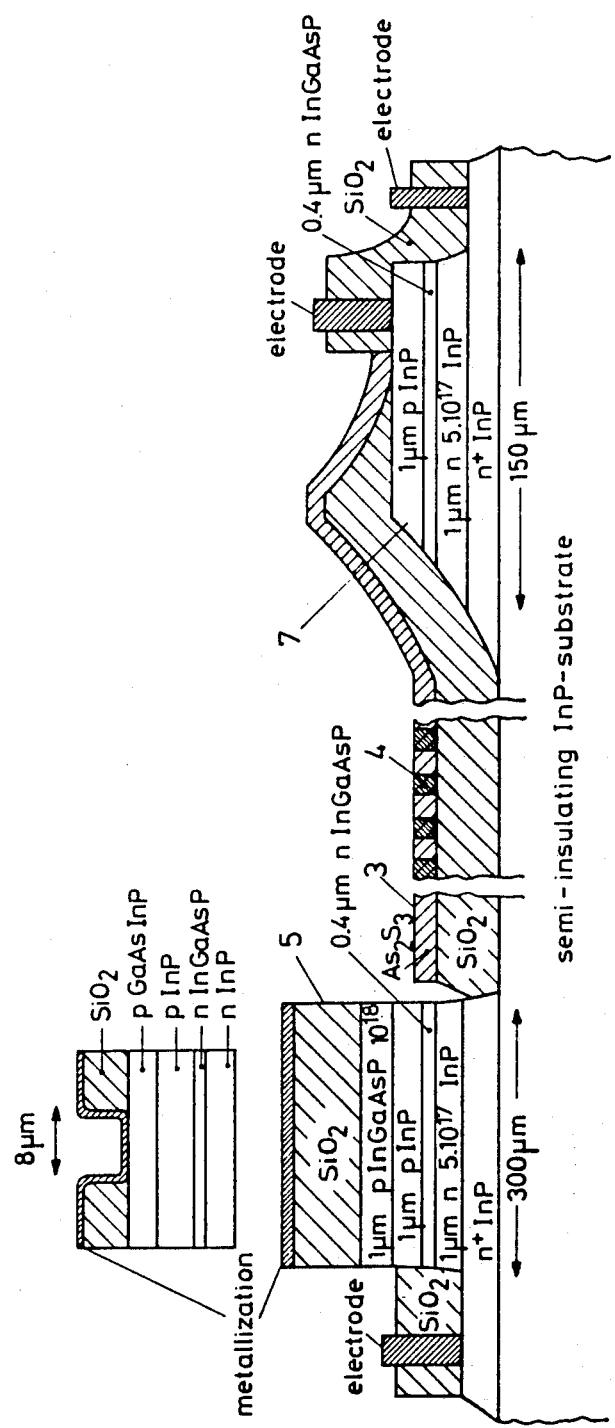
FIG. 3 shows partial cross sectional views of the embodiment of FIG. 2 indicating possible structures of the film waveguide as well as of the refraction grating the laser and the photodiode.

The stripe geometry laser 5 as well as the photodiode 7 are integrated with the duplexer in a manner which is shown in a cross-sectional view in FIG. 3. Both are multilayer heterodiodes which have as the lowest layer on top of the semi-insulating InP-substrate an n+-InP epitaxial buffer layer, then, as the second epitaxial layer of 1 μm thickness, an n-InP layer. The third epitaxial layer for both elements is a 0.4 μm thick n-InGaAsP layer lattice-matched to InP and tuned in the width of its band gap to the wavelength at which the laser is to oscillate. The fourth epitaxial layer is 1 μm thick and consists of p-type InP. The laser 5 alone has a fifth epitaxial layer of p-InGaAsP of 1 μm thickness and again lattice-matched to InP.

The $SiO_2$-buffer layer of the film waveguide 3 covers both the uppermost fifth epitaxial layer of the laser 5 as well as the uppermost fourth epitaxial layer of the photodiode 7. On top of the laser 5 this $SiO_2$-buffer layer leaves only a narrow (8 μm wide) stripe open, along which the metallization on top of the laser-part of the $SiO_2$-layer makes a barrier-free contact with the p-GaAsInP-layer of the laser 5 and thereby defines the active layer strip in the n InGaAsP layer underneath. The other electrical contact to the laser diode 5 is made by an electrode with a barrier-free interface to the lowest n+-InP layer of the laser 5 in a region to which the other epitaxial layers of the laser do not extend.

On top of the photodiode 7 the $SiO_2$-buffer layer continues to carry the $As_2S_3$-guiding layer of the film waveguide 3 but it gradually tapers out, so that the fundamental mode of the film waveguide 3 is absorbed by the photodiode 7. One electrical contact to the photodiode 7 is made by an electrode through an opening in the $SiO_2$-buffer layer to the uppermost p-InP-layer, and the other contact to the lowest n+-InP-layer, again in a region to which the other epitaxial layers do not extend.

The structure of FIGS. 2 and 3 can be fabricated by first growing the epitaxial layers of laser 5 and photodiode 7, and then removing these epitaxial layers except for the laser and photodiode areas. Subsequently the $SiO_2$-buffer layer is deposited and partially removed again on top of the laser 5 and the photodiode 7. Next the metallization is applied to form the contacting electrodes for laser 5 and photodiode 7, and the $As_2S_3$ guiding layer deposited to form the film waveguide 3 on top of the $SiO_2$-buffer layer. Finally the elliptical arc lines of the refraction grating 4 are written into the $As_2$-$S_3$- layer by electron beam lithography. The individual steps in the fabrication of the integrated micro optical device can all be performed in manners well known in the art.

It will be understood that the above description of the present invention is susceptible to various modifications, changes and adaptations, and the same are intended to be comprehended within the meaning and range of equivalents of the appended claims.

What is claimed is:

1. An integrated, micro-optical device for use in combination with a monomode fiber, a laser and a photodiode, said device comprising:
   a common substrate including means for connecting the fiber, laser and photodiode to said device;
   a film waveguide disposed on said substrate and presenting a first beam path between said means for connecting the fiber and said means for connecting the photodiode;
   a refraction grating disposed in the first beam path of said film waveguide, said film waveguide presenting a second beam path between said means for connecting the laser and said refraction grating;
   wherein said refraction grating is composed of parallel lines which are arranged in confocal elliptical arcs and which are so spaced apart to define a selective filter which transmits radiation coming from the fiber and having a first wavelength toward the photodiode, and deflects radiation coming from the laser and having a second wavelength different from the first wavelength in the direction toward the fiber.

2. An arrangement as defined in claim 1, wherein the fiber has an end face and the laser has an output face, and said confocal elliptical arcs of said refraction grating have one focal point in the center of the end face of the fiber and another focal point in the center of the ouput face of the laser.

3. An arrangement as defined in claim 1, wherein said first and second beam paths have respective first and second longitudinal axes and said refraction grating is arranged so that a line normal to the parallel lines of said refraction grating makes an angle of substantially 45° with a respective one of said first and second longitudinal axes.

4. An arrangement as defined in claim 1 in combination with the monomode fiber, wherein said fiber has a radiation input and the lines of said refraction grating have such a curvature that the deflected laser radiation is matched to said fiber radiation input.

5. An arrangement as defined in claim 1, in combination with the laser, wherein said laser is a strip laser disposed directly on said substrate.

6. An arrangement as defined in claim 1, wherein said film waveguide has a fundamental mode which is capable of being excited by radiation from the fiber.

7. An arrangement as defined in claim 1, wherein said film waveguide has a fundamental mode which is capable of being excited by radiation from the laser.

8. An arrangement as defined in claim 6 in combination with the laser, wherein the radiation from said laser includes oscillations having a transversal fundamental order which excites the fundamental mode of said film waveguide.

9. An arrangement as defined in claim 1 in combination with the photodiode, wherein said photodiode is integrated into said substrate.

* * * * *